Nov. 8, 1949 M. C. REHILL 2,487,590
AIRCRAFT TRIP CALCULATOR
Filed Feb. 14, 1947 2 Sheets-Sheet 1
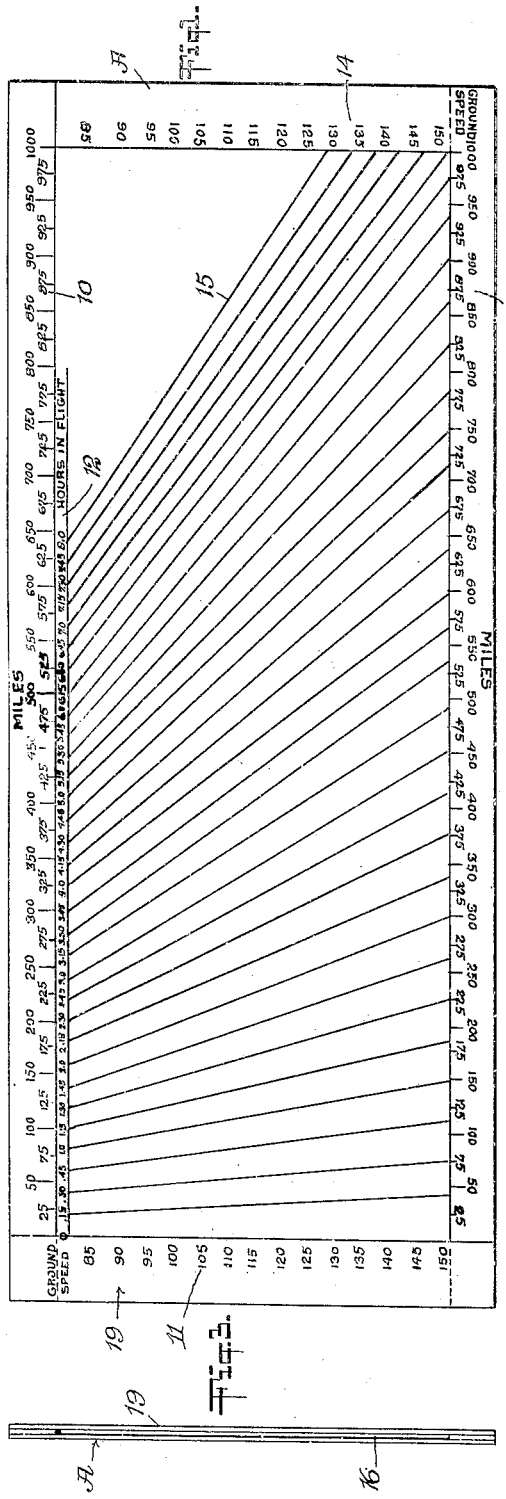
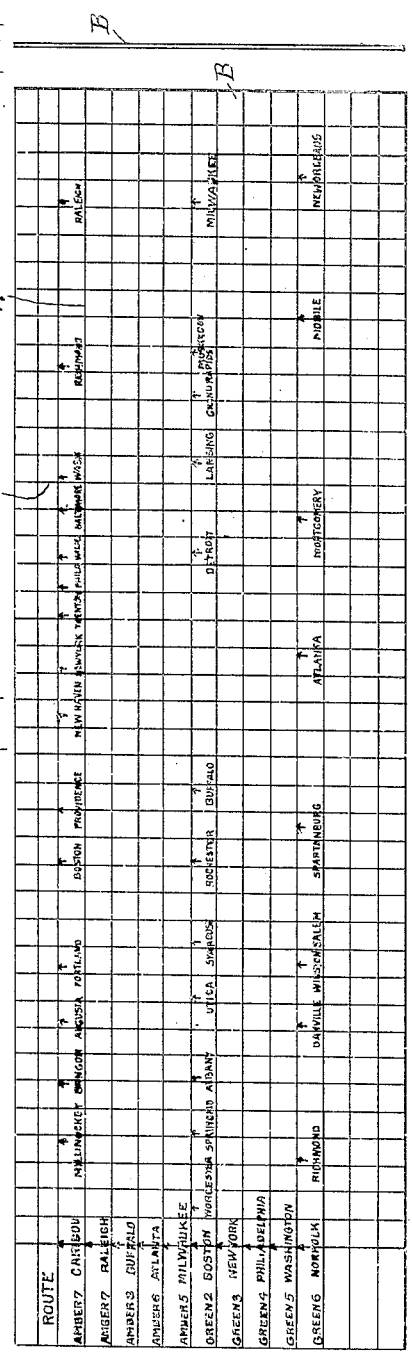
INVENTOR.
Melvin C. Rehill
BY
Munn, Liddy & Daccum
Attorneys Nov. 8, 1949      M. C. REHILL      2,487,590
AIRCRAFT TRIP CALCULATOR
Filed Feb. 14, 1947      2 Sheets-Sheet 2
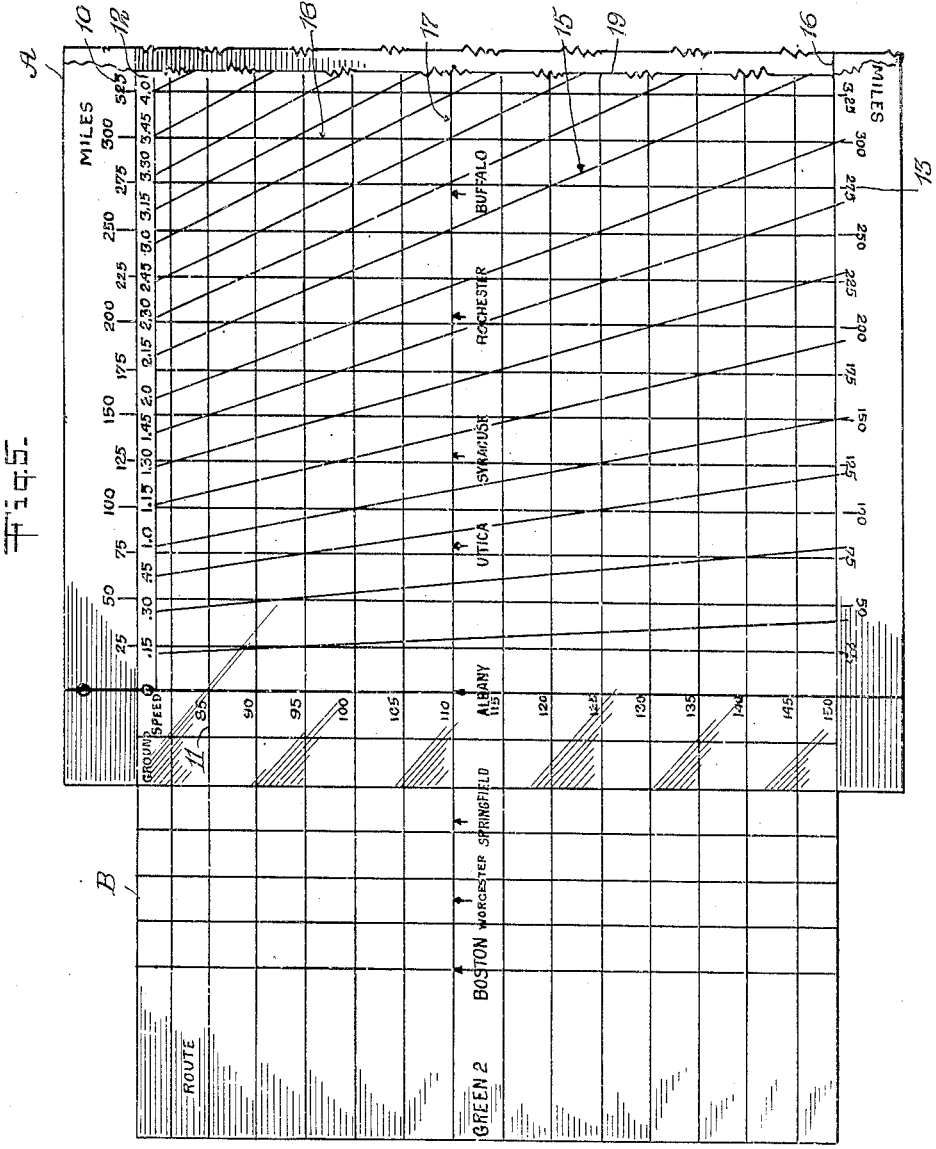
INVENTOR.
Melvin C. Rehill
BY
Munn, Liddy & Glaccum
Attorneys Patented Nov. 8, 1949

2,487,590

UNITED STATES PATENT OFFICE 2,487,590

AIRCRAFT TRIP CALCULATOR

Melvin C. Rehill, White Plains, N. Y.

Application February 14, 1947, Serial No. 728,477

2 Claims. (Cl. 235—89)

This invention relates generally to computation devices and, more particularly, to an instrument for aid in aerial navigation.

It is my objective to provide a calculating instrument from which pertinent information relative to navigational data may be quickly and efficiently obtained without lengthy computations.

My device consists of a holder with a transparent face within which a card containing predetermined data may be slidably mounted. Super-imposed on the transparent face of the holder are mileage, ground speed and elapsed time scales, while on the card a plurality of air routes are set out in a definite pattern with each airport or major city indicated on the separate routes. Through manipulation of the slidable card, it is possible to determine the exact distance in miles between any two points on a specified route and, with the additional knowledge of the ground speed at that particular instance, it is possible to quickly determine the flight hours between those two points.

An added feature of this device is that the slidable member is replaceable and may be changed for other cards when the plane is operating over a different set of routes. Through this feature, a small number of cards will provide world-wide coverage of the known commercial air routes for any area desired. It is merely necessary for the pilot or navigator to select the card covering the particular route or area over which the plane will fly and he will then be able, through a manipulation of the device, to quickly and accurately determine the mileage and elapsed flying time to his destination.

On trans-ocean flying, where it is necessary to fly a route that approximates the great circle course between the two points, instead of cities or airports being indicated, a specific location will be obtained in terms of latitude and longitude. Such a reading may also be used for navigational purposes in that they can be utilized in determining assumed positions for precomputation of cellestial observations.

An additional feature is that on the reverse or back side of each slidable member it is contemplated to have a small scale map indicating the routes, principal cities and airports located in the area covered by the routes indicated on the front of the card. Also, there will be additional space for data concerning the airports in that area such as the type of field, hangar fees, refueling facilities, etc. Such a device as mine would be extremely valuable to planes which are in distress and desire to know how far away and approximately how long it would take them to reach an emergency field, the location of which would be accurately indicated on the various routes. My device has equal application whether used by commercial airlines flying local or overseas routes, or by the private individual on an aerial trip in his own plane.

My device is simple in its operation, easily understood, inexpensive to produce, and mechanically reliable in its computations.

Further advantages and novel features of my device will be apparent as I proceed with the description.

With reference to the drawings—

Figure 1 shows a plan view of the holder, with a transparent face;

Fig. 2 shows a plan view of the slidable member which is mounted in the holder;

Fig. 3 shows an end elevation of the transparent holder;

Fig. 4 shows an end elevation of the slidable member; and

Fig. 5 shows a plan view of the holder and slidable member in operable position.

With reference to the drawings, in Fig. 1 I show a holder A with a transparent face 19 which can be made from Celluloid, plastic, or other similar material through which the indicia on the slidable member B will be clearly visible. Fig. 3 shows an end elevation of the holder A with a slot 16 in which the member B may be slidably mounted. Both the transparent face 19 of the holder A and the member B have suitable indicia placed upon their surfaces for the purpose of computing the desired information. Face 19 of the holder A has three scales, namely, the mileage scale 10 positioned horizontally along the top of the face 19, the ground speed scale 11 positioned vertically along the left edge of the face 19, and the hours in flight scale 12 which is located horizontally directly below the mileage scale 10. In view of the fact that to facilitate certain computations the holder A may be inverted, the mileage scale and the ground speed scale are duplicated as indicated by the inverted mileage scale 13 and ground speed scale 14. Also on the face 19 are accurately plotted divergent radial lines 15, the distance between any two lines representing a fifteen minute interval. These lines constitute the hours in flight scale or a unit of time scale. The lines 15 are positioned at different angles;

the variation of the angle being determined by the varying distances covered at different air speeds in the same elapsed time.

Fig. 2 shows the slidable member B slightly longer in length than the holder A and which is accurately marked with equally spaced horizontal and vertical lines 17 and 18, respectively. The horizontal lines 17 serve two purposes in that they accurately correspond to the various markings of the ground speed scale 11 on the face 19 and are also used to accurately position the major cities or airports on a particular route. An arrow located directly above the city or airport accurately positions the location of that point with respect to the mileage scale 10 on the face 19. The vertical lines 18 are evenly spaced and correspond to the markings of the mileage scale 10, each division representing a distance of twenty-five miles.

In flying great circle routes, similar information will be incorporated on the slidable member B. However, the location of a specific point instead of being designated by a city or airport, will be indicated by a latitude and longitude reading. As a great circle route will be flown in several "legs," each "leg" will be indicated by its limit in latitude and longitude. Instead of route numbers, the true heading may be used to designate that particular "leg." When the termination of one "leg" is reached, a new true heading reading will be set out as another route followed by a corresponding change in latitude and longitude readings.

The slidable member B can be made from semi-rigid paper, cardboard, or any other similar material that will serve the purpose. Member B is expendable and replaceable at extremely low cost and a variety of such cards, governing different air routes and sections of the country, may be interchanged at will.

Fig. 5 illustrates the method by which a problem is solved by this device. Assume that the pilot is flying on Route Green 2 from Boston to Milwaukee and that he has determined his position as being a few miles outside of Albany. He now desires to determine how long it will take him to reach Buffalo. By sliding the member B to the left until the arrow indicating Albany is at the zero of the mileage scale 10, he follows the route line to the arrow indicating Buffalo. By following the arrow indicating Buffalo vertically with reference to the mileage scale 10, he reads approximately 270 miles. Knowing that his ground speed is 125 M. P. H. he can then, by following the 270 mile vertical line down to the point where it intersects the 125 M. P. H. horizontal line, determine his reading. At this point it is found that the intersection is approximately half-way between the two hour and two hour fifteen minutes radial lines of scale 12. By apportioning the distance between these two lines, a reading of approximately two hours and eight minutes is obtained. The device may also be used to compute data when flying a reverse route. For example, on Route Green 2 from Milwaukee to Boston. To adjust the device for this type of reading, it is merely necessary to remove the slidable member B from the holder A and then reverse the holder A so that the mileage scale 13 is at the top and the ground speed scale 14 is at the left. The card B is then inserted in the holder and the desired data is computed, utilizing scales 13 and 14 in conjunction with scale 12.

While the invention has been described in detail with respect to a present preferred form which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of any one or more of the appended claims.

I claim:

1. A computing device comprising a transparent member and a slidable member mounted therein, a plurality of scales arranged on said transparent member, said scales including a velocity scale in terms of ground speed, a unit of time scale, and a mileage scale, said time scale comprising a plurality of divergent radial lines, a plurality of parallel vertical and horizontal lines on said slidable member disposed to co-act with said scales, indicia on said slidable member representing specific air routes and geographical locations, said transparent member adapted to be selectively super-imposed upon said slidable member causing the divergent radial lines on said transparent member to register with the parallel lines and indicia on said slidable member whereby the mileage and elapsed flight time may be computed between any of the said geographical locations.

2. A computing device comprising a transparent member and a slidable member mounted therein, a plurality of scales arranged on said transparent member, said scales including a vertical velocity scale in terms of ground speed, a horizontal mileage scale and a plurality of divergent radial lines comprising a unit of time scale, a plurality of equally spaced parallel vertical and horizontal lines disposed on said sliding member to co-act with said scales, a vertical column of indicia on said slidable member representing specific air routes, geographical locations positioned on said horizontal lines, said transparent member adapted to be selectively super-imposed upon said slidable member causing the scales on said transparent member to register with the indicia and geographical locations on said slidable member whereby mileage and elapsed flight time may be computed between any of said geographical locations.

MELVIN C. REHILL.

REFERENCES CITED

The following references are of record in the file of this patent:

UNITED STATES PATENTS

| Number | Name | Date |
|---|---|---|
| 2,179,531 | Trapnell | Nov. 14, 1939 |

FOREIGN PATENTS

| Number | Country | Date |
|---|---|---|
| 183,347 | Great Britain | July 27, 1922 |